United States Patent

[11] 3,547,196

| | | | |
|---|---|---|---|
| [72] | Inventor | Philip J. Closmann | |
| | | Houston, Tex. | |
| [21] | Appl. No. | 792,678 | |
| [22] | Filed | Jan. 21, 1969 | |
| [45] | Patented | Dec. 15, 1970 | |
| [73] | Assignee | Shell Oil Company | |
| | | New York, N.Y. | |
| | | a corporation of Delaware | |

[54] METHOD FOR FRACTURING A SUBTERRANEAN EARTH FORMATION
9 Claims, 7 Drawing Figs.
[52] U.S. Cl. .................................................. 166/281
[51] Int. Cl. ........................................................ E21b 43/26
[50] Field of Search ............................................. 166/281, 307, 308

[56] References Cited
UNITED STATES PATENTS

| | | | | |
|---|---|---|---|---|
| 2,596,845 | 5/1952 | Clark.............................. | (166/308UX) |
| 2,784,787 | 3/1957 | Matthews et al............... | 166/281 |
| 2,788,072 | 4/1957 | Goodwin........................ | 166/281 |
| 2,796,131 | 6/1957 | Hinchliffe et al. ............. | 166/281 |
| 2,805,721 | 9/1957 | Maly ............................. | 166/281 |
| 2,813,584 | 11/1957 | Teplitz ......................... | 166/281X |
| 3,160,207 | 12/1964 | McEver......................... | 166/307 |
| 3,161,235 | 12/1964 | Carr.............................. | 166/281 |
| 3,289,762 | 12/1966 | Schell et al. .................. | 166/281 |

Primary Examiner—Marvin A. Champion
Assistant Examiner—Ian A. Calvert
Attorneys—Louis J. Bovasso and J. H. Mc Carthy ABSTRACT: A method for forming a generally horizontal fracture in a subterranean earth formation interval of relatively homogeneous low permeability by reducing the permeability of a radially extensive zone in the subterranean earth formation interval to a value less than that of an underlying relatively permeable horizontal layer in which the permeability is left unchanged. Fluid is pumped into the relatively permeable layer bounded by the zone in which the permeability was reduced and the subterranean earth formation is fractured by increasing the pressure on the fluid being pumped into the relatively permeable layer to a pressure that exceeds both the overburden and fracture pressure of the relatively permeable layer of the formation interval.

PATENTED DEC 15 1970

INVENTOR:
PHILIP J. CLOSMANN
BY: Louis J. Bovasso
HIS ATTORNEY

INVENTOR:
PHILIP J. CLOSMANN
BY: Louis J. Bovasso

HIS ATTORNEY

PATENTED DEC 15 1970

INVENTOR:
PHILIP J. CLOSMANN
BY Louis J Bovasso
HIS ATTORNEY

3,547,196

METHOD FOR FRACTURING A SUBTERRANEAN EARTH FORMATION

BACKGROUND OF THE INVENTION

1. Field of the Invention

The invention relates to the fracturing of subterranean earth formations; and, more particularly, to a method for forming generally horizontal fractures in subterranean earth formations of relatively homogeneous low permeability.

Recovery of oil or gas directly from underground formations of relatively homogeneous low permeability is preferable for many obvious reasons, but because of the impermeability of such formations, in situ oil or gas recovery is difficult or impractical. Although means of recovery are known to the art, as evidenced by reference to U.S. Pat. Nos. 2,969,226; 3,139,928; or 3,233,668, they are generally impractical because they are costly, ineffective and present other undesirable problems.

SUMMARY OF THE INVENTION

It is an object of this invention to establish permeable channels in subterranean earth formations of relatively homogeneous low permeability.

It is a further object of this invention to use a relatively permeable channel in a subterranean earth formation of otherwise relatively homogeneous low permeability in order to form a generally horizontal fracture within the earth formation.

These objects are carried out by reducing the permeability of a radially extensive zone within a subterranean earth formation interval of relatively homogeneous low permeability to a value less than that of an underlying relatively permeable horizontal layer in which the permeability is left unchanged. Fluid is pumped into the relatively permeable layer bounded by the zone in which the permeability was reduced and the subterranean earth formation is fractured by increasing the pressure on the fluid being pumped into the relatively permeable layer to a pressure that exceeds both the overburden and fracture pressure of the relatively permeable layer of earth formation interval.

DESCRIPTION OF THE PREFERRED EMBODIMENTS

Figure 1:
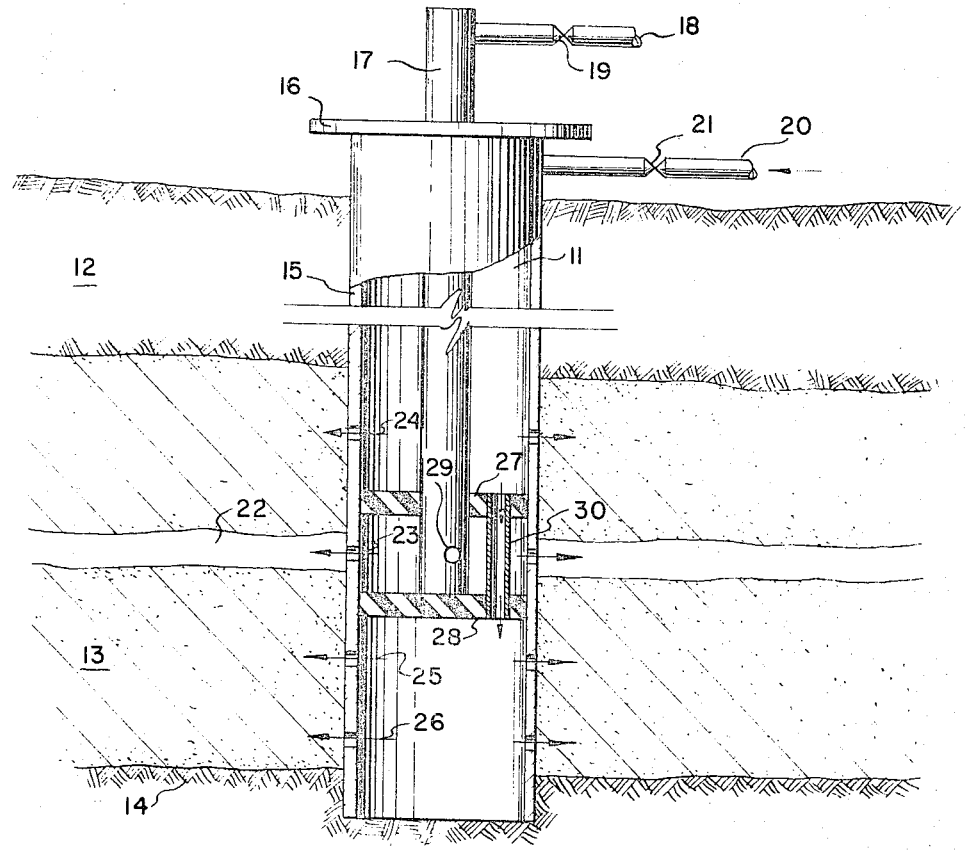
FIG. 1 is a vertical sectional view of a subterranean earth formation prior to fracturing the formation in accordance with the teachings of my invention.

Referring to FIG. 1 of the drawing, there is shown a well borehole 11 extending through overlying earth formation 12 into communication with a subterranean hydrocarbon-bearing formation 13. Formation 13 is of relatively homogeneous low permeability, such as a low-permeability gas reservoir and is confined by a lower layer 14. Well borehole 11 is preferably cased at casing 15. The casing 15 may be cemented in borehole 11, if desired. Casing 15 is preferably closed at its upper end 16 and preferably includes a tubing string 17 extending therethrough to the vicinity of formation 13. A fluid inlet 18, controlled by valve means 19 is in communication with both an external fluid source (not shown) and tubing string 17 for introducing fluids therein. A fluid inlet 20, controlled by valve means 21, is disposed at the upper end of casing 15 and communicates with both an external fluid source (not shown) and the interior of well borehole 11 for introducing fluids therein.

A relatively thin interval, such as a generally horizontal layer 22, which need be only as permeable as the remainder of formation 13, as illustrated in FIG. 1, is disposed in formation 13. Well casing 15 may be perforated adjacent to layer 22 at perforation 23 by any means known in the art, as for example jet or bullet perforating means. Although only one such perforation 23 is shown in FIG. 1, obviously a plurality of such perforations may be formed adjacent to layer 22. Casing 15 may also be perforated in like manner above and below layer 22 adjacent to formation 13, as for example at upper perforation 24 and lower perforations 25 and 26 (i.e., above and below layer 22 as illustrated in FIG. 1). Again, a plurality of such perforations may be formed adjacent to formation 13.

Tubing string 17 is then packed off above and below perforation 23. Tubing string 17 thus extends through upper packer 27 but does not pass through lower packer 28 so that fluid cannot flow from tubing string 17 below packer 28. Any conventional straddle-packing arrangement may, or course, be used. Tubing string 17 includes one or more ports or openings 29 for introducing fluid from tubing string 17 through perforation 23 and into layer 22. A relatively short section of tubing string 30 extends through both upper packer 27 and lower packer 28 and is open at both ends for passing fluid therethrough.

In operation, the permeability of formation 13 above and below layer 22 may be reduced by a focused injection of a plugging material, such as a fluid or liquid, by injection into inlet 20, out of perforation 24, through tubing string 30 and out of perforations 25 and 26 into formation 13. Simultaneously, or before or after injection of fluid through inlet 20, a nonplugging fluid may be injected from inlet 18, down tubing string 17, out of opening 29, through perforation 23 and into layer 22. The quantity of the plugging material injected is preferably such as to permit a reasonably radially-extensive injection of viscous fluid during the fracturing stage which will be described further hereinbelow. For this reason, an impermeable barrier is preferably formed, extending at least a few feet radially outward from well borehole 11.

Figure 2:
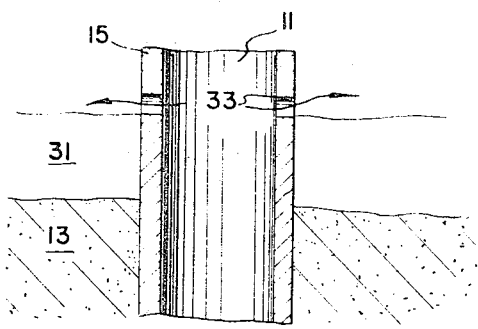
FIG. 2 is a partial vertical sectional view of an alternate method for treating the formation of FIG. 1.

Alternatively to injecting a plugging material above and below a layer 22 as illustrated in FIG. 1, the plugging material may be injected above a similar layer 31 as illustrated in FIG. 2, wherein like numerals equal like parts of FIG. 1. For convenience of illustration, the tubing strings 17 and 30 of FIG. 1 have been omitted in FIGS. 2 and 3. Thus, the plugging fluid or material is injected through perforation 33 above layer 31, which layer 31 is underlaid by relatively impermeable layer 13.

The process of my invention may use substantially any plugging agent that can be injected as a liquid and converted to a solid or highly viscous gel within the earth formation. Preferably, the densities of the plugging and nonplugging fluids are made substantially equal. For example, a brine may be used as a nonplugging fluid and a slowly-gelling aqueous solution of silicate as the plugging fluid, with the density of the brine being substantially matched to that of the aqueous silicate.

Figure 3:
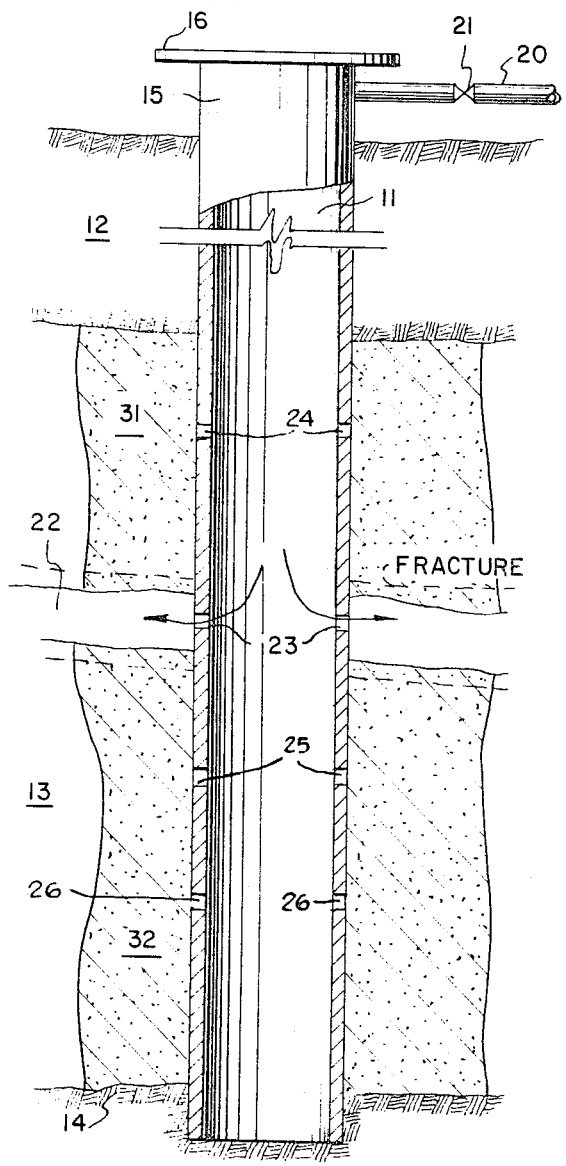
FIG. 3 is a vertical sectional view of the earth formation of FIG. 1 during the fracturing operation.

Referring now to FIG. 3, tubing strings 17 and 30 and packers 27 and 28 have been removed from well borehole 11 for convenience of illustration. The straddle packing assembly of FIG. 1 may be left in place during the fracturing operation. The areas above and below layer 22 harden as the plugging material sets, forming upper and lower impermeable barriers 31 and 32, respectively.

In operation, a fracturing fluid, such as a viscous oil, foam or other fluid, is injected through inlet 20 into casing 15, out of perforation 23 and into permeable layer 22. The fracturing fluid may be substantially any fluid having a viscosity sufficient, relative to the permeability of layer 22, to provide a significant pressure drop along radial lines of flow in layer 22. Obviously, due to the hardening of the plugging material above and below layer 22, the fracturing fluid does not penetrate the plugged layers communicating with perforations 24, 25 and 26. Such fluids may be gaseous or liquid and may comprise single-phase or two-phase systems, such as foams or emulsions, as long as they exhibit a sufficient effective viscosity.

The relatively viscous fracturing fluid is preferably pumped into the unplugged permeable layer 22 at a pressure less than the fracturing pressure of formation 13 until the injected fracturing fluid extends radially for at least several feet from the inner wall of well borehole 11. The pressure of the fracturing fluid is then increased so that the pressure within the well borehole 11 and within a layer extending at least several feet into the earth formation (i.e., into layer 22 from the inner wall of borehole 11) rises to a pressure that exceeds, on one hand, the overburden pressure of formation 13 and, on the other hand, the fracturing pressure of formation 13. The fracturing of formation 13 allows fluid to be injected at a relatively low pressure through the formation 13 for the subsequent recovery of hydrocarbon-bearing components therein, as is well known in the art.

Figure 4:
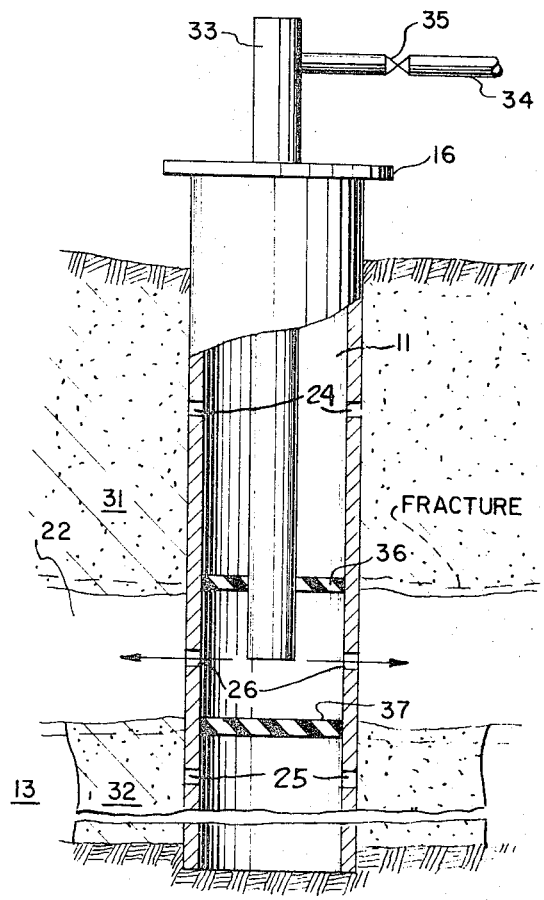
FIG. 4 is a vertical sectional view of the earth formation of FIG. 1 during an alternate fracturing operation.

The generally horizontal fracture (shown in dotted lines in FIG. 3) may be extended and/or propped by techniques known to those skilled in the art. The radially extensive plugged zones 31 and 32, at least the portions thereof adjacent to the unplugged layer 22, act as large-diameter pistons that are subjected to a vertical force exceeding the horizontal force applied to the fracturing fluid being pumped radially out through the unplugged layer 22. Where the portions of zones 31 and 32 that contain the plugging fluid may still have a tendency to fracture vertically, the unplugged layer 22 is preferably isolated by packing off the well borehole 11 so that the injection pressure is applied to the formation only along the face of the unplugged layer 22. This is illustrated in FIG. 4, wherein like numerals refer to like parts of FIG. 3. Here, a tubing string 33 is shown extending into communication with layer 22. A fluid inlet 34 and valve means 35 is associated with tubing string 33 for introducing fracturing fluid into layer 22. Well borehole 11 is packed off at packers 36 and 37 straddling perforation 26 so that fluid is injected only along the face of the unplugged layer 22. This operation may be further aided by severing the well casing 15 at the depth to be fractured.

In all of the foregoing, it is noted that the operations of FIGS. 3 and 4 are also applicable to the plugging zone formed by fluid injection as illustrated in FIG. 2.

By using the principles of my invention, it is possible to generate multiple horizontal fractures in a subterranean earth formation, either simultaneously or sequentially.

Figure 5:
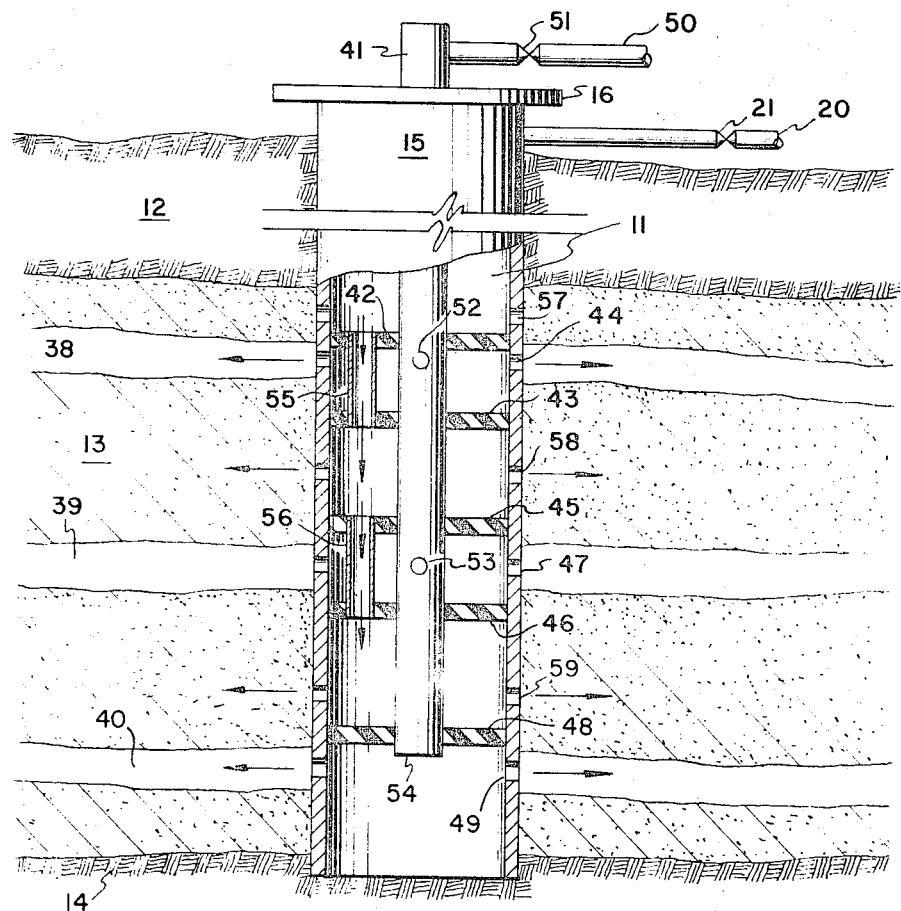
FIG. 5 is a vertical sectional view of a subterranean earth formation in which a plurality of fractures are produced in accordance with the teachings of my invention.

As illustrated in FIG. 5, wherein like numerals refer to like parts of FIG. 1, an arrangement is shown whereby well borehole 11 may be prepared for injecting fluid into a plurality of relatively thin permeable, generally horizontal layers, as for example layers 38 through 40. Thus, a tubing string 41 extends through well borehole 11 and passes through, first, packers 42 and 43, packing off perforation 44; second, packers 45 and 46, packing off perforation 47; and third, through packer 48, packing off perforation 49. Perforations 44, 47, and 49 are disposed adjacent to layers 38 through 40, respectively. Tubing string 41 includes a fluid inlet 50, controlled by valve means 51, for introducing fluid thereto and is provided with a plurality of ports or openings 52 and 53, disposed adjacent to perforations 44 and 47, respectively, for introducing fluid therethrough. The bottom end 54 of tubing string 41 is open so that fluid may be flowed from tubing string 41 through perforation 49 and into layer 40. A pair of short sections of tubing strings, namely tubing strings 55 and 56, are disposed adjacent to perforations 44 and 47, respectively. Thus, tubing string 55 passes through packers 42 and 43 so that fluid flow therethrough may bypass perforation 44 and tubing string 56 passes through packers 45 and 46 so that fluid flow therethrough may bypass perforation 47. Finally, casing 15 may be perforated at a plurality of points adjacent to formation 13, as for example at perforations 57 through 59.

In all of the foregoing, although only single perforations have been illustrated disposed adjacent to layers 38 through 40 and the portions of formation 13 adjacent to the layers, obviously a plurality of such perforations may be so disposed as long as all of the perforations adjacent to their respective layers are sealed off as indicated above. Also, although three permeable layers 38 through 40 have been illustrated, obviously a plurality of such layers may be disposed in formation 13 with subsequent sealing off as discussed hereinabove with respect to FIG. 5.

Figure 6:
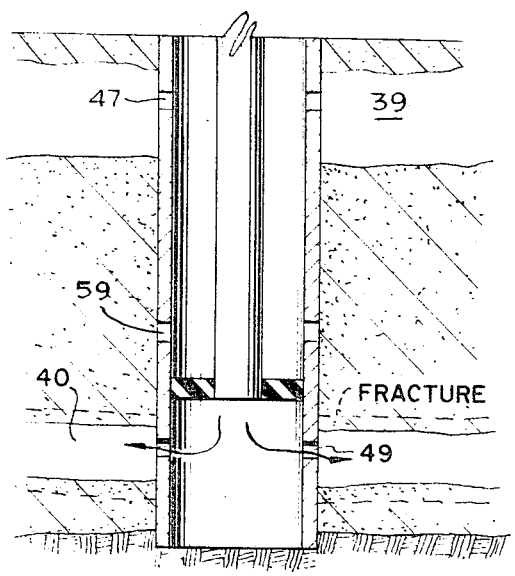
FIG. 6 is a vertical sectional view of one method of fracturing the formation of FIG. 5.
Figure 7:
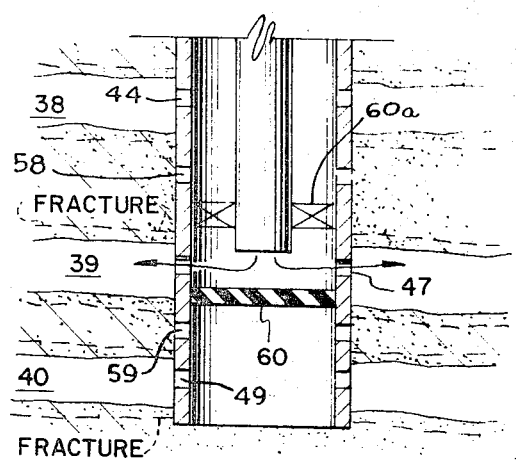
FIG. 7 is a vertical sectional view of a further step in the method of fracturing the formation of FIG. 5.

Referring once again to FIG. 5, plugging and nonplugging fluid is injected down casing 15 and tubing string 41 as discussed hereinabove, with respect to FIG. 1. Subsequent injection of a viscous fracturing fluid down tubing string 41 may be conducted either simultaneously with the fluid flowing out of openings 52, 53 and bottom end 54 through perforations 44, 47 and 49, respectively; or, alternatively with the layers 38 through 40 being treated individually. Thus, only perforation 49 may be packed off with the viscous fluid injected down tubing string 41 and out through perforation 49 until layer 40 is horizontally fractured, as illustrated in FIG. 6 wherein like numerals refer to like parts of FIG. 5. The next zone up, that is layer 39, may be treated in like manner with the bottommost zone packed off, as at packer 60, as illustrated in FIG. 7 wherein like numerals also refer to like parts of FIG. 5. Obviously, a similar packer or any suitable means 60a may be disposed in well borehole 11 above layer 39 but below perforations 58 so that only layer 39 may be treated in the manner described hereinabove. These steps may be continued in like manner until all horizontal layers have been fractured. If vertical fracturing appears likely to occur where the process is applied, fracturing may be begun at the topmost layer 38 rather than at the bottom layer 40. Where vertical fractures already exist, a low fluid-loss fluid, such as a cement slurry, may be first pumped into the vertical fractures to seal them. The foregoing steps may then be then carried out as described hereinabove.

Once one or more permeable and/or porous horizontal channels or fractures have been established, general oil recovery schemes such as hot fluid injection, for example steam, hot water and mixtures thereof; hot gases, for example air; gaseous hydrocarbons such as hot hydrogen sulfide and mixtures of hydrocarbons and hydrogen sulfide; solvents, for example aliphatic and aromatic liquid hydrocarbons such as benzene, xylene, kerosene, etc., the solvents being hot or cold as well as conventional in situ combustion means such as injection thermal energy to selected portions of the formation as well as various other means, as described on pages 95 through 104 of the World Oil issue of Jan. 1965 and U.S. Pat. Nos. 3,105,545; 3,150,715; 3,208,516; 3,221,810; and 3,250,328, as well as explosives (liquid or solid), may be employed for fluidizing materials for recovery through the production well and processing it for oil recovery as is well known in the art.

I claim:

1. A method for forming a generally horizontal fracture in a subterranean earth formation interval of relatively homogeneous low permeability having at least one underlying relatively permeable generally horizontal unplugged layer therein, said method comprising the steps of:

reducing the permeability of at least one radially extensive zone in said subterranean earth formation interval of relatively homogeneous low permeability immediately overlying said layer to a value less than that of said underlying relatively permeable generally horizontal unplugged layer in which the permeability is left unchanged;

pumping fluid selectively into the relatively permeable generally horizontal unplugged layer bounded by the zone in which the permeability was reduced until the injected fluid has been extended radially for at least several feet into the unplugged layer; and subsequently fracturing the subterranean earth formation by increasing the pressure on the fluid being pumped into the relatively permeable generally horizontal unplugged layer to a pressure that exceeds both the overburden and fracture pressures of the relatively permeable generally horizontal unplugged layer of the earth formation interval.

2. The method of claim 1 wherein the step of reducing the permeability of a radially extensive zone includes the step of pumping a plugging material into the radially extensive zone and the step of pumping fluid into said unplugged layer includes the step of simultaneously pumping a nonplugging fluid of substantially equal density to the plugging material into the underlying relatively permeable generally horizontal unplugged layer.

3. The method of claim 2 wherein the step of pumping a plugging material includes the step of pumping a relatively slowly-gelling aqueous solution of silicate and the step of pumping a nonplugging fluid includes the step of pumping brine having a density substantially equal to that of the aqueous solution.

4. The method of claim 2, including the step of extending at least one well borehole downwardly into communication with said earth formation and subsequently pumping said plugging materials and said fluids down said well borehole into said formation.

5. The method of claim 4 including the step of packing off said well borehole above and below a point adjacent to said permeable layer; and pumping said fluid from said point into said layer.

6. The method of claim 1 wherein the step of reducing the permeability of a radially extensive zone includes the step of injecting a plugging material above and below the relatively permeable generally horizontal unplugged layer and the step of pumping fluid into said unplugged layer includes the step of simultaneously injecting an equal-density nonplugging fluid into said generally horizontal unplugged layer.

7. The method of claim 1 wherein the step of pumping fluid into the relatively permeable layer includes the step of pumping a relatively viscous fracturing fluid therein.

8. The method of claim 1 including the step of:
reducing the permeability of each radially extensive zone above each of a plurality of relatively permeable layers; and
selectively pumping fluid into each of said layers while increasing the pressure thereon beginning with the lowermost layer in said formation and moving upwardly to the next adjacent layer until all of said layers have been fractured.

9. The method of claim 8, including the step of pumping a low fluid-loss fluid into any vertical fractures present in said formation prior to selectively pumping fluid into each of said layers.